Jan. 10, 1956 R. P. HAWKINSON 2,729,853
MOLD FOR RETREADING PNEUMATIC TIRE CASINGS
Filed Oct. 20, 1952
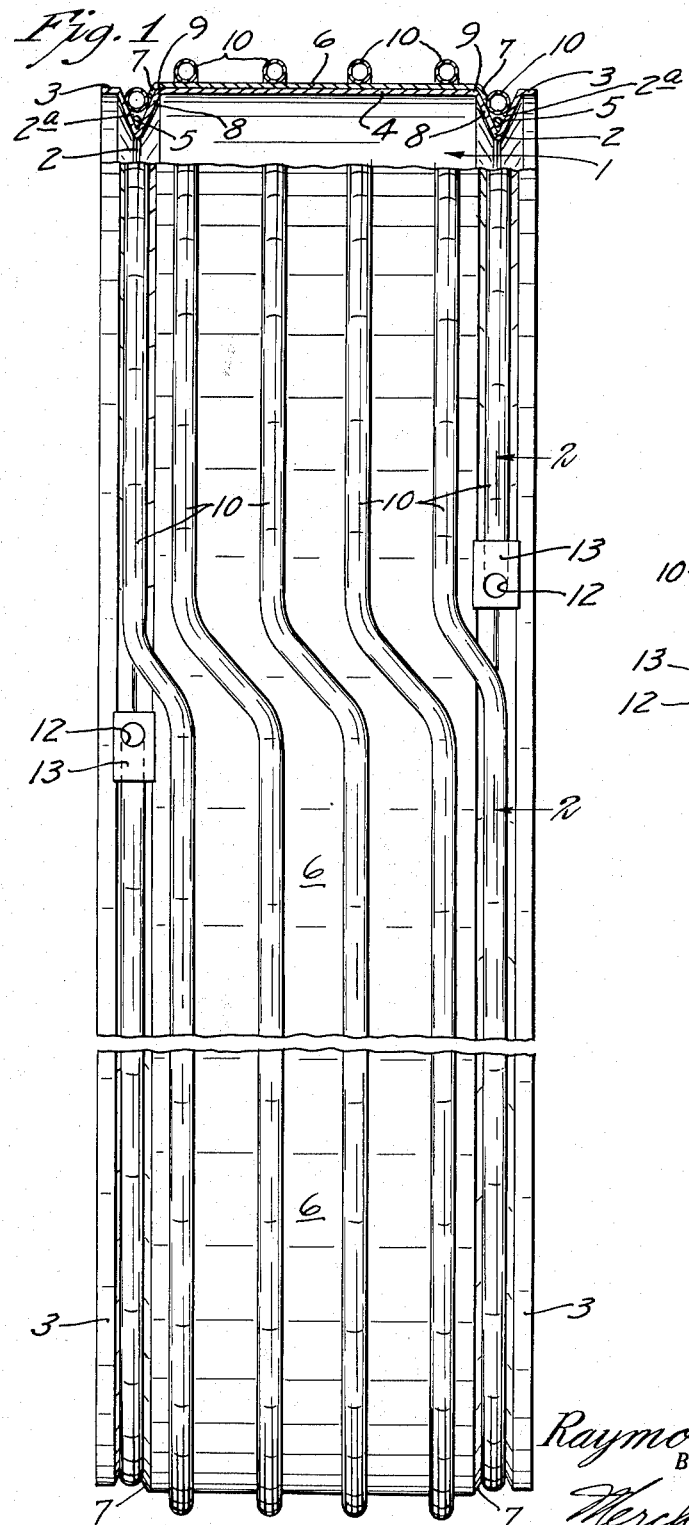
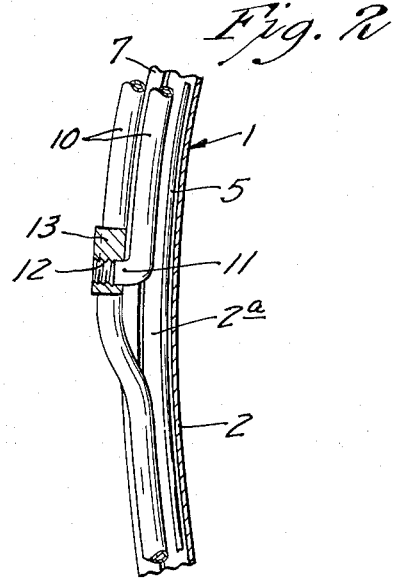
INVENTOR.
Raymond P. Hawkinson
BY
Merchant & Merchant
ATTORNEYS

United States Patent Office 2,729,853
Patented Jan. 10, 1956

---

2,729,853

MOLD FOR RETREADING PNEUMATIC TIRE CASINGS

Raymond P. Hawkinson, Minneapolis, Minn., assignor to Paul E. Hawkinson Company, Minneapolis, Minn., a corporation of Minnesota Application October 20, 1952, Serial No. 315,618

1 Claim. (Cl. 18—18)

My invention relates to devices for applying treads to pneumatic tire casings and is in the nature of an improvement upon the structures disclosed and broadly claimed in U. S. Patent No. 1,917,262.

In late years, for the purpose of appearance, the tread material confining flanges adjacent the opposite sides of molds of the above type have been radially deepened so as to extend over the shoulders of the tires, to some extent. In molds of this character, the heat is applied by means of a heating coil generally spirally wound around the exterior of the matrix. Therefore, as the confining flanges became deeper, it was observed that insufficient heat was being imparted to the radially innermost portions of the confining flanges. Particularly is this true in "Hawkinson" molds of the type disclosed in U. S. Patent No. 2,339,696, wherein the tubular heating conduit is secured to a reinforcing jacket clamped tightly about the peripheral surface of the matrix.

The primary object of my invention is the provision of the novel endless sheet metal matrix, which is provided with inexpensive and highly efficient means for heating all of the matrix, including the radially innermost portions of the confining flanges thereof. More specifically, my invention provides a novel heating means for sheet metal matrices which are provided, at least in part, with endless reinforcing jackets.

The above and still further objects of my invention will become apparent from the following detailed specification, appended claim and attached drawings.

Referring to the drawings, wherein like characters indicate like parts throughout the several views:

Fig. 1 is a view in plan, some parts broken away and some parts shown in transverse section; and Fig. 2 is an enlarged fragmentary detail, taken on the line 2—2 of Fig. 1.

Referring with greater particularity to the drawings, the numeral 1 indicates an endless cylinder-like matrix formed from sheet metal and having generally V-shaped radially inwardly-projecting parallel tread material-confining flanges 2 adjacent its side edges 3. As shown, the side edges 3 are in the nature of endless cylinder-like lips lying in the same plane as the cylindrical portion 4 intermediate the confining flanges 2.

Endless wires 5 are preferably inserted in the bottoms of the cavities 2a of the confining flanges 2. Also, an endless reinforcing jacket 6 is wrapped tightly about the peripheral surface of the matrix 1. U. S. Patent No. 2,331,679 discloses the preferred method of applying jacket 6 to the matrix 1. It will be noted that the opposite side edges 7 of the jacket 6 overlap the opposed side walls 8 of the V-shaped cavities 2a and are bent angularly inwardly into engagement therewith, so as to reduce to a minimum any tendency of the matrix 1 to flex at the points 9, due to lateral spreading action of a tire casing contained between the confining flanges 2.

For the purpose of heating my novel matrix, above described, I wind generally spirally thereof an endless tubular heating conduit 10. Specifically, it will be noted, approximately one convolution of the heating conduit 10, at its opposite ends, is nestingly received within the V-shaped cavities 2a provided by the confining flanges 2; whereas, the intermediate portion of the heating conduit 10 is wrapped generally spirally about and secured by solder or the like, to the external peripheral surface of the reinforcing jacket 6. The extreme opposite end portions of the heating conduit 10 are bent and extend radially outwardly of the cavities 2a, as indicated at 11. Also, preferably and as shown, the ends 11 are received within screw-threaded openings 12 in enlarged inlet and outlet fittings, both bearing the numeral 13.

My invention has been thoroughly tested and found to be completely satisfactory for the accomplishment of the above objects; and, while I have disclosed a preferred embodiment thereof, it is obvious that the same is capable of modification without departure from the scope of the appended claim.

What I claim is:

A device for applying treads to pneumatic tire casings, said device comprising an integral cylinder-like matrix formed from sheet metal and having its opposite side edge portions extending radially inwardly defining continuous, unbroken, unobstructed, parallel V-shaped tread material confining flanges of uniform size and shape throughout the full annular extent thereof, an endless band-like reinforcing jacket around the external peripheral surface of said matrix intermediate said confining flanges, said reinforcing jacket having opposite axial side edge portions overlapping the opposed axial inner walls of said V-shaped confining flanges and pressed angularly radially inwardly into engagement therewith preventing the flexing of said matrix due to lateral spreading action of a tire casing contained between the confining flanges, an endless generally spirally-wound tubular heating conduit about said matrix having substantially one convolution at opposite ends of said conduit nestingly received totally within each of said V-shaped confining flanges, the convolutions of said coil intermediate said flanges being secured to the radial outer surface of said reinforcing jacket, and the opposite ends of said tubular heating conduit projecting radially outwardly of said matrix and terminating radially outwardly of said flanges in portions providing inlet and outlet fittings.

References Cited in the file of this patent

UNITED STATES PATENTS

| | | |
|---|---|---|
| 2,331,680 | Hawkinson | Oct. 12, 1943 |
| 2,339,696 | Hawkinson | Jan. 18, 1944 |
| 2,370,972 | Kraft | Mar. 6, 1945 |
| 2,644,984 | Crooker | July 14, 1953 |